Jan. 17, 1961    E. F. WAGNER    2,968,512
VEHICLE WINDOW REGULATOR
Filed March 15, 1956    4 Sheets-Sheet 1

INVENTOR.
Edward F. Wagner
BY
Wilson, Redrow & Sadler
ATTORNEY.

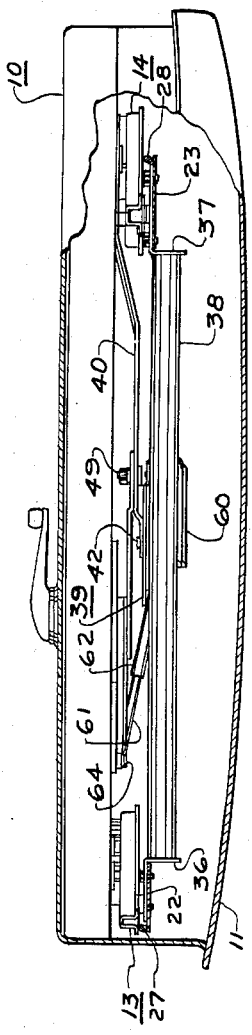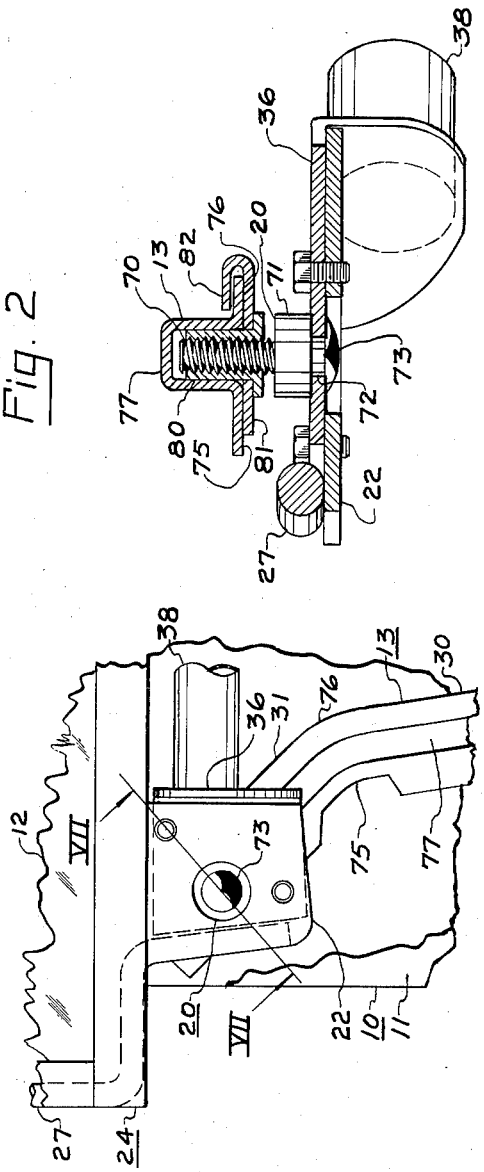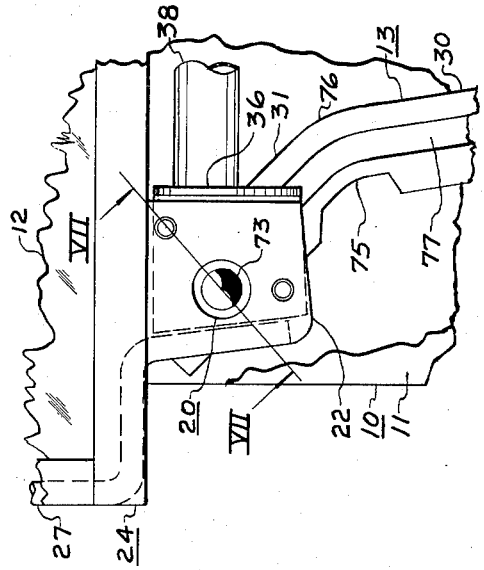

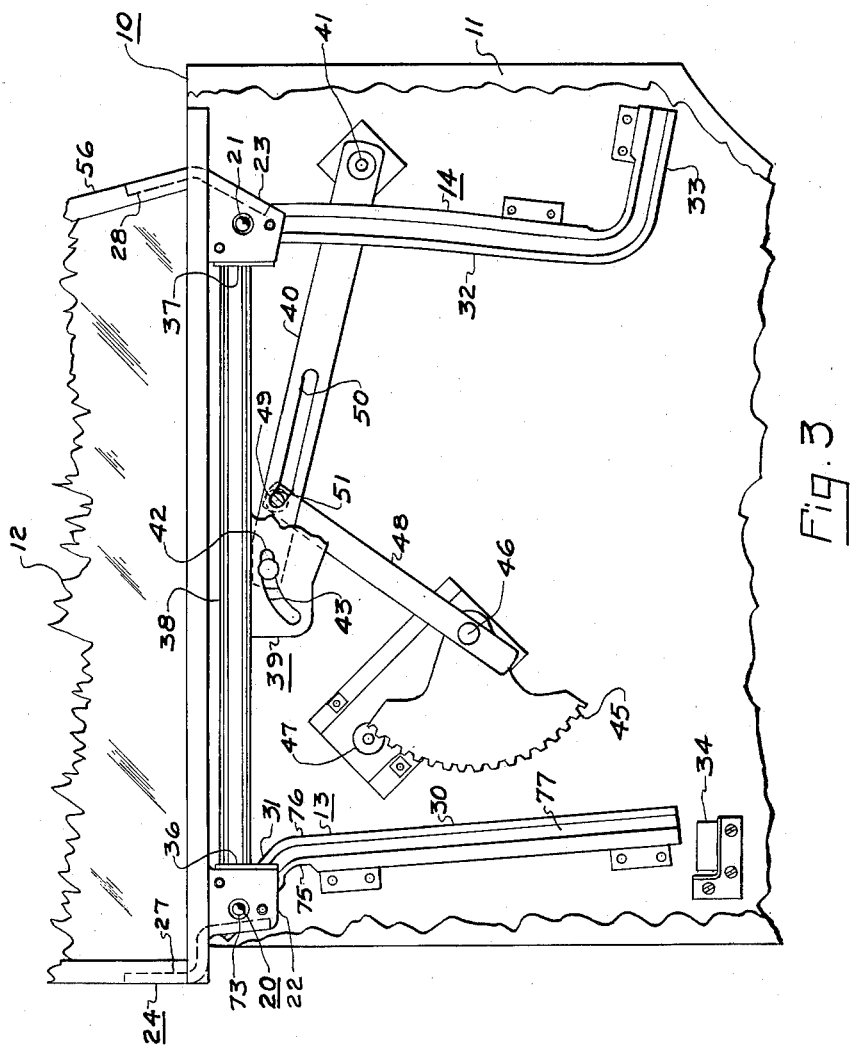

Jan. 17, 1961  E. F. WAGNER  2,968,512
VEHICLE WINDOW REGULATOR
Filed March 15, 1956  4 Sheets-Sheet 4

INVENTOR.
Edward F. Wagner
BY
Wilson, Redrow & Sadler

United States Patent Office 2,968,512
Patented Jan. 17, 1961

2,968,512

VEHICLE WINDOW REGULATOR

Edward F. Wagner, Lakeville, Ind., assignor to Studebaker-Packard Corporation, Detroit, Mich., a corporation of Michigan Filed Mar. 15, 1956, Ser. No. 571,667

11 Claims. (Cl. 296—44)

This invention relates generally to window regulator assemblies and particularly to window regulator assemblies for the doors of automotive vehicles commonly referred to as "hard tops."

An automobile referred to as a hardtop has the characteristic that the doors of the vehicle are not provided with window openings. With a hardtop type construction other means than the conventional window openings must be provided to (1) guide the windows during raising and lowering and (2) seal or weatherproof the windows when they are closed. The window regulator assembly of the present invention is suitable for the windows of hardtop type vehicles. The features of the invention are also applicable to windows generally and is not limited to windows installed in the doors of vehicles.

A main object of the invention is to provide a new and improved window regulator assembly and specifically a new and improved window regulator assembly for a hardtop type automotive vehicle.

Another object of the invention is to provide a window regulator assembly having (1) new and improved guide means for guiding a window between a raised and lowered position, (2) a new and improved lever mechanism and arrangement for raising and lowering a window, (3) a new and improved window stabilizer assembly which functions to stabilize and to seal or weatherproof a window in a hardtop type automotive vehicle, and (4) a new and improved guide follower assembly.

Other objects of the invention will become apparent from the following specification, the drawings relating thereto, and the appended claims.

In the drawings:

Fig. 2 is a sectional view taken on line II—II of Fig. 1;

Fig. 3 is an elevational view similar to Fig. 1 except that the window stabilizer assembly thereof is omitted so that the guide means and regulator mechanism may be clearly illustrated;

Fig. 6 is an enlarged view of a portion of Fig. 1 showing the guide follower assembly on the left side thereof and other elements associated with the guide follower assembly; and Fig. 7 is a sectional view taken on line VII—VII of Fig. 6.

Figure 1:
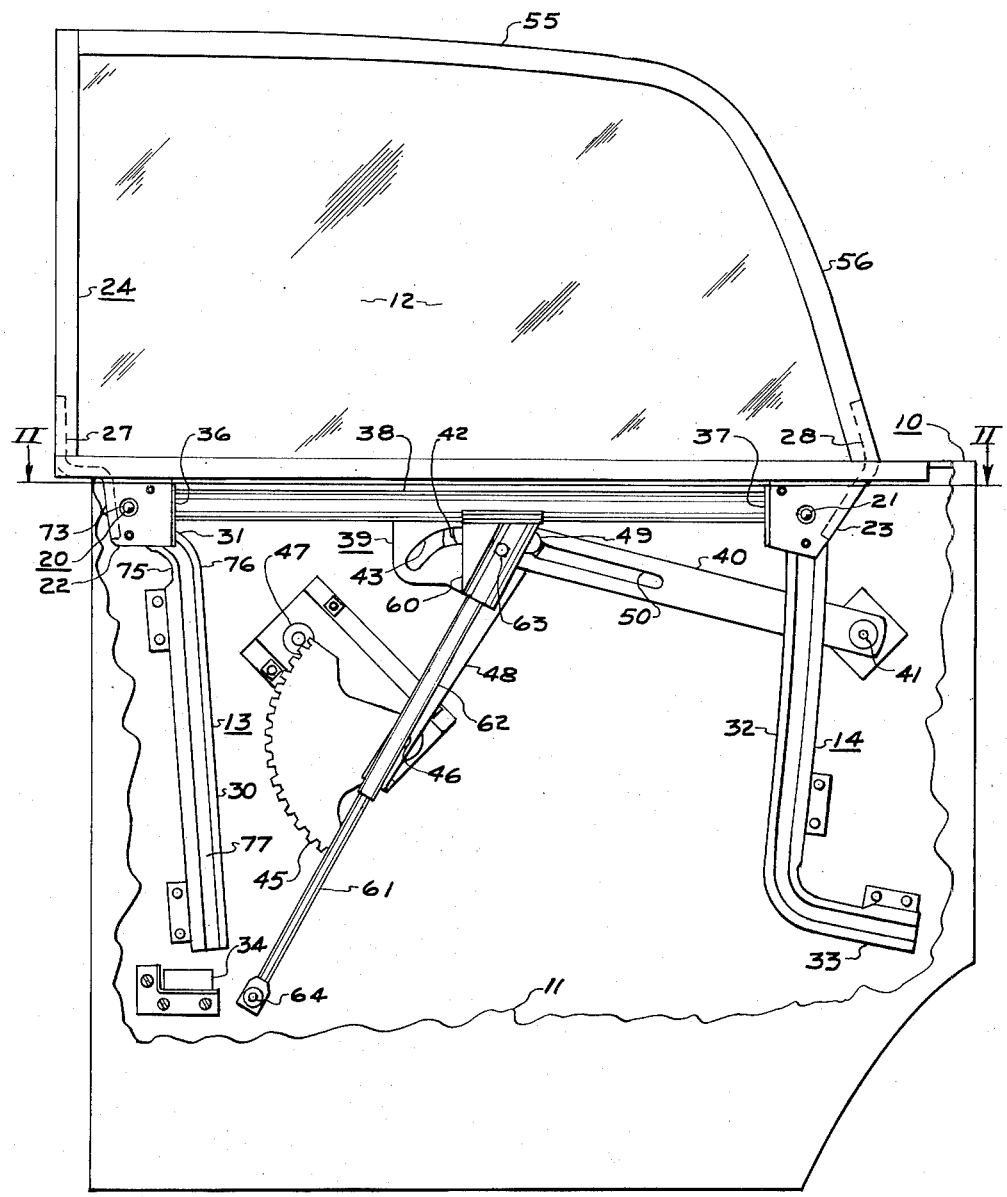
Fig. 1 is an elevational view of a window regulator assembly constructed in accordance with the present invention which is illustrated as being installed in the rear door of a four door "hardtop" automotive vehicle, the view being from the outside of the vehicle with a portion of the door panel broken away to show the regulator.

Referring to the drawings, there is shown in Fig. 1 an elevational view of an illustrative embodiment of a window regulator assembly constructed in accordance with the present invention and installed in a supporting structure. The supporting structure is illustrated herein by way of example as being a door 10 of the kind used for hardtop and convertible type automotive vehicles. Door 10 is a rear door and the view of Fig. 1 is from the outside of the vehicle, the outer panel 11 of the door 10 being broken away to permit illustration of the regulator assembly.

As Figs. 1 and 2 represent complete assembly views, only the other figures will be referred to specifically hereinafter to describe the various features of the invention.

A window 12 is provided and the guide means and regulator mechanism for raising and lowering the window 12 are most clearly shown in Fig. 3. First and second guide means are provided which are illustrated herein as rails 13 and 14 attached to the door structure in a generally vertical plane. Rails 13 and 14 are positioned in spaced apart relation and are adapted to be engaged by followers 20 and 21 which are operably connected to window 12. The specific construction of rails 13 and 14 and followers 20 and 21 will be described in detail further on and it is sufficient at this point to merely mention that followers 20 and 21 are spaced apart a fixed distance and their paths of travel are determined by rails 13 and 14.

Followers 20 and 21 are operably and in effect attached to the lower edge of window 12. Window 12 is provided with a surrounding frame 24 through which the window is attached to the regulator mechanism and followers 20 and 21 are operably attached to generally plate shaped brackets 22 and 23 respectively. Rod members 27 and 28, which are bent to have suitable shapes, are attached to brackets 22 and 23 respectively and to frame 24 as by welding. With this construction followers 20 and 21 are operably connected to the lower edge of window 12 although the followers do not actually touch the glass.

In accordance with the invention the path of motion of window 12 is controlled entirely by the guides or rails 13 and 14 during raising and lowering of the window. In general the rails 13 and 14 are positioned in spaced apart relation. Rail 13 is provided with an elevator portion 30, which is illustrated as being a straight length of rail, and an upper or holding portion 31 which extends in a direction away from rail 14 and in the illustrated embodiment of the invention also extends upwardly. Rail 14 is provided with an elevator portion 32, which is illustrated as being slightly arcuate but which could be a straight length of rail if desired, and a lower portion 33 which extends in a direction away from rail 13 and in the illustrated embodiment of the invention extends in a generally horizontal direction away from rail 13. The significance and specific meaning of the term "elevator" with reference to a portion of a rail 13 or 14 is that when a follower 20 or 21 is on the elevator portion of one of the rails the predominant movement of the follower is in a vertical direction although concomitant horizontal movement of the follower while it is on an elevator portion of a rail is not precluded. Therefore, within the scope of the invention, the elevator portions 30 and 32 may be either straight or curved.

With regard to the spacing of elevator portions 30 and 32 from each other, such spacing at each elevation common to both elevator portions should be somewhat less than the spacing between followers 20 and 21. With this construction the lower edge of window 12 will be inclined when the followers 20 and 21 are in respective engagement with the elevator portions 30 and 32 of the rails. When the window 12 is in a raised position as illustrated in Fig. 3, the lower edge of the window is horizontal with the follower 20 being in engagement with the holding portion 31 of rail 13 and the follower 21 being in engagement with the elevator portion 32 of rail 14. During the lowering of window 12 the follower 21 travels a substantial distance downward on rail 14, almost to the junction between elevator 32 and lower portion 33, during which time the follower 20 travels only a relatively short distance on rail 13 and merely approaches the junction between holding portion 31 and elevator portion 30 of rail 13. In this intermediate position of the window 12 the lower edge of the window is inclined at a substantial angle which may be on the order of 45° for example. The significance of the term "holding" with regard to holding portion 31 of rail 13 will be understood at this point in that the follower 20 is "held" to a limited amount of travel by holding portion 31 of rail 13 during which time follower 21 travels a substantial distance on the elevator portion 32 of rail 14.

From the intermediate position of window 12 just described the window moves to a lowered position where the lower edge of the window is again horizontal. In reaching the lowered position the follower 21 travels a relatively short distance on the lower portion 33 of rail 14, which extends in a horizontal direction away from rail 13, during which time follower 21 travels the entire length of the elevator portion 30 of rail 13. A stop 34 is provided for abutting engagement with bracket 22 to limit the downward movement of follower 20.

The window 12 follows the same path in reverse during the raising thereof. An appropriate actuator mechanism must of course be provided to transmit lowering and raising forces to the window 12 but the actual guiding of the window with regard to the path it takes during raising and lowering is dependent entirely on the spacing between followers 20 and 21 and the positioning and shapes of the guide rails 13 and 14.

Referring now to the actuator or regulator mechanism for transmitting raising and lowering forces to window 12, this is also clearly shown in Fig. 3. It is desirable to transmit these forces at a point in the vicinity of the lower edge of window 12 and about midway between the ends of the lower edge. Structure for applying the forces at this point includes a rod or bar 38 which is rigidly attached to L-shaped brackets 36 and 37 as by welding. Brackets 36 and 37 are in turn attached to brackets 22 and 23 or with screw fasteners so that rod 38 in effect extends between brackets 22 and 23. In addition to being a force transmitting link between the actuator mechanism and window 12, the rod 38 also serves as a rigid stiffening and spacing member between follower brackets 22 and 23. Rod 38 also functions in the stabilizing of window 12 as will be described further on.

A bracket 39 is rigidly attached to rod 38 at or near its midpoint as by welding. In effect bracket 39 is operably attached to the lower edge of window 12 and between the ends of the lower edge. The right side portion of bracket 39 is broken away in Fig. 3 so that the regulator mechanism can be clearly illustrated.

A lever 40 is provided having one end operably connected to bracket 39 and the other end pivotally connected to the door structure 10 at a pivot point 41 which is located so that lever 40 will have a generally horizontal position when the window 12 is in a raised position. A lost motion connection is provided between bracket 39 through which raising and lowering forces are transmitted from the lever arm 40 but the lost motion connection does not influence the path the window takes, this being the function of guides 13 and 14. A pin and slot connection is a suitable lost motion arrangement in this instance and, as illustrated herein, a pin 42 is provided on the end of lever arm 40 and a slot 43 is provided in bracket 39. The slot and pin could of course be reversed if desired. As window 12 is raised and lowered the bracket 39 follows a somewhat irregular path between rails 13 and 14 and the slot 43 must be long enough to accommodate this path without causing binding between pin 42 and slot 43 as lever arm 40 pivots about point 41.

Another feature of the invention is that slot 43 is made arcuate in shape so that the forces between pin 42 and bracket 39 are generally normal to the longitudinal axis of lever arm 40 during a substantial portion of the up and down travel of window 12. The particular shape of the arcuate slot is of course dependent upon the length of lever arm 40 and the shapes and positioning of guide rails 13 and 14.

The means for causing pivotal movement of lever arm 40 includes a conventional gear segment 45 having a pivot point 46 and a gear segment driving pinion 47. Fixedly attached to gear segment 45 for pivotal movement therewith is an actuator arm 48 which is operably connected to lever 40 by means of a lost motion arrangement. A pin and slot connection is a suitable lost motion arrangement in this instance and as illustrated herein, a pin 49 is provided on the end of actuator arm 48 and a slot 50 is provided in lever arm 40. The pin and slot could of course be reversed if desired. The pivot point 46 of gear segment 45 and actuator arm 48 is positioned so that actuator arm 48 forms a slightly larger angle than 90° with the slot 50 in lever arm 40 when the window 12 is in a raised position. With regard to operation, clockwise pivotal movement of actuator arm 48 causes counterclockwise pivotal movement of lever arm 40 and vice versa.

An important feature of the invention is a locking device incorporated into the regulator mechanism. An extension of slot 50 is provided which may be referred to as a spur slot 51. Spur slot 51 is relatively short in length and angles off slightly from slot 50. Spur slot 51 is arranged so as to be normal to actuator arm 48 when the window 12 is in a raised position. During the time window 12 is being raised actuator arm 48 moves counterclockwise and pin 49 moves to the left in slot 50 causing lever arm 40 to pivot counterclockwise until the window 12 is moved to its raised position. At the instant window 12 is in its fully raised position the actuator arm pin 49 enters spur slot 51 and, as spur slot 51 is then normal to actuator arm 48, pin 49 continues its movement to the left a short distance further in spur slot 51 without causing further upward movement of the window 12. The theory of this locking device is that a downward force on the window 12 which is not exerted through the actuating mechanism, such as the force of gravity for example, is not converted into a turning force on lever arm 40 which might cause a slight lowering of window 12. The external force is instead transmitted so as to be colinear with the longitudinal axis of actuator arm 48 and is rigidly resisted by the pivot axis of actuator arm 48. It is thus seen that the window 12 cannot be lowered by an external force without bending actuator arm 48 or shearing of the pivot axis of actuator arm 48.

Figures 4, 5:
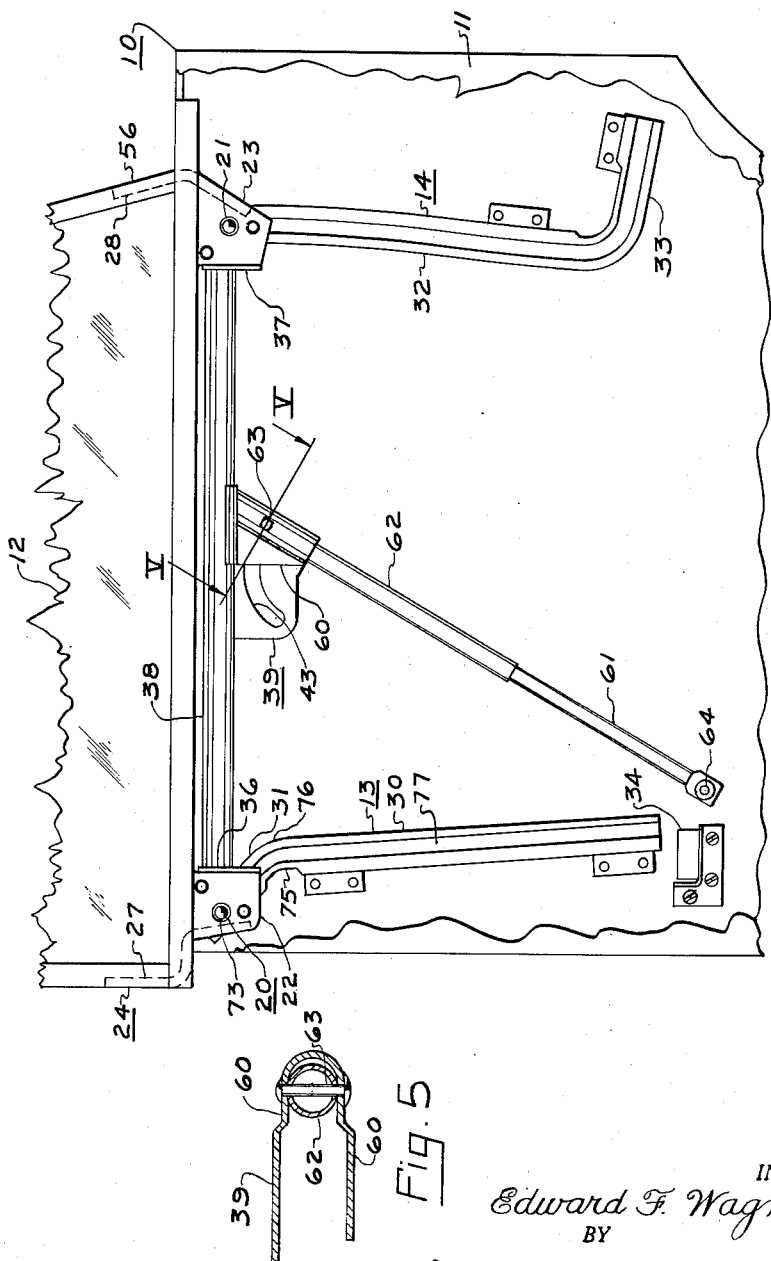
Fig. 4 is an elevational view similar to Fig. 1 except that the regulator mechanism thereof is omitted so that the window stabilizer mechanism may be clearly illustrated.
Fig. 5 is an enlarged, fragmentary sectional view taken on line V—V of Fig. 4.

Reference is now made to the stabilizing and weatherproofing of window 12, this feature being best shown in Figs. 4 and 5. For this feature use is made of the rod or bar 38 which extends between follower brackets 22 and 23 as a torsion rod or bar. It is mentioned above that torsion rod 38 is rigidly connected to window frame member 24 through brackets 36 and 37, brackets 22 and 23, and rod members 27 and 28. The body of the vehicle in which the illustrated door and window assembly is installed is preferably formed so that sections 55 and 56 (see Fig. 1) of frame 24 forcibly engage rubber weatherstripping (not shown) fastened to the edges of the door opening of the vehicle when the door 10 is closed and the window 12 is in a raised position. A torsional force will thus be transmitted to torsion rod 38 if the middle portion of torsion rod 38 is attached so as to be nonrotatable relative to the door structure.

With the construction described window 12 is both stabilized and weatherproofed when the door 10 is closed and window 12 is in a raised position.

The means for attaching torsion rod 38 to the door structure includes a holster bracket 60, which may be integral with bracket 39 as illustrated or rigidly attached directly to torsion rod 38, and telescoping rods 61 and 62. Rod 61 is pivotally connected to the door structure 10 and rod 62 is pivotally connected to holster bracket 60. Holster bracket 60 has a generally U-shaped portion with the pivot axis 63 of rod 62 extending through the sides of the U. The pivot axis 64 of rod 61 and the U-shaped portion of bracket 60 are arranged, positioned and formed so that the rod 62 is snugly engaged by the sides of the U when the window 12 is in a raised position, the diameter of rod 62 being of proper size so that a snug engagement is obtained. With this construction the torsion rod 38 is nonrotatably attached at its midpoint to the door structure 10. When the window 12 is in its raised position, lateral forces applied to the window 12 or its surrounding frame 24 are transmitted to the torsion rod and are torsionally resisted by it. Forcible engagement of the window frame 24 with weatherstripping in the door opening of the vehicle body, as referred to above, is one source of lateral forces which are torsionally resisted by torsion rod 38.

When the window 12 is lowered there is relative pivotal movement between holster bracket 60 and rod 62 so that rod 62 moves out of its snug engagement with the U-shaped portion of holster bracket 60. Thus it is only when window 12 is in its fully raised position that torsion rod 38 torsionally resists lateral forces applied to the window or its frame 24. As the window 12 moves between its fully raised and fully lowered positions, and vice versa, there is a telescoping movement between rods 61 and 62 and both rods pivot about the pivot axis 64 to accommodate the raising and lowering movement of window 12. There of course is a close fit between rods 61 and 62 to facilitate the stabilizing function when window 12 is in a fully raised position.

Referring now to the specific construction of the followers 20 and 21 and guide rails 13 and 14, this is best illustrated in Figs. 6 and 7. Only guide rail 13 and follower 20 will be referred to because guide rail 14 and follower 21 may be of the same construction.

Follower 20 includes a threaded stud 70 having a shoulder portion 71 and a tang portion 72 which facilitates the forming of a rivet head 73 for riveting stud 70 to bracket 36. Follower 21 may be fixedly attached to bracket 37 in the same manner. As mentioned above, brackets 36 and 37 are attached to brackets 22 and 23 with screw fasteners.

Follower 20 engages guide rail 13 which is illustrated as having longitudinally extending shoulder portions 75 and 76 and a generally U-shaped channel portion 77 therebetween.

Threaded stud 70 threadedly engages a cylindrically shaped, internally threaded member 80 which has a circular flange and which is adapted to be disposed in guide channel portion 77, there being provided a sliding fit between member 80 and the sides of channel portion 77. Disposed between the circular flange of member 80 and the channel shoulder portions 75 and 76 is a plate member 81 having a hole through which stud 70 extends. The circular flange of member 80 is attached to plate member 81, which is generally rectangular in shape, as by welding. Plate member 81 has a laterally extending portion 82 which bends around the edge of at least one of the guide shoulder portions 75 or 76 in straddling relation thereto. As there is a convex bend in guide shoulder portion 76 it is preferable that laterally extending portion 82 engage shoulder portion 76, it being easier for portion 82 to be guided around a convex curve than a concave curve.

Plate member 81, with its laterally extending portion 82, functions to maintain follower 20 in the guide rail 13 and preferably there is provided a sliding fit between laterally extending portion 82 and guide shoulder portion 76.

The threads in the internally threaded flanged member 80 of follower 20 in effect serve as a bearing for threaded stud 70. Torsion rod 38 pivots as much as 30 or 40 degrees relative to guide rails 13 and 14 and this pivotal movement actually takes place between threaded stud 70 and flanged member 80. There is also a few degrees of relative angular movement between plate member 81 and guide rail 13 during the travel of follower 20 in rail 13 and thread stud 70 also acts as a bearing for this movement. The relative angular movement between stud 70 and flanged member 80 is never as much as a complete rotation, however, and there is no chance for these two parts to become threadedly disengaged.

In the operation of the follower 20 the cylindrical portion of flanged member 80 follows the contour of guide rail 13. As plate member 81 allows only a very limited amount of relative pivotal movement between flanged member 80 and rail 13, the threaded connection between stud 70 and flanged member 80 acts as a bearing to permit the required pivotal movement between torsion rod 38 and rail 13. The laterally extending portion 82 of plate member 81 has the double function of preventing rotation of flanged member 80 relative to rail 13 and preventing follower 20 from being lifted out of the channel portion 77 of rail 13.

The invention may be embodied in other specific forms without departing from the spirit or essential characteristics thereof. The present embodiment of the invention is therefore to be considered in all respects as illustrative and not restrictive, the scope of the invention being indicated by the appended claims rather than by the foregoing description, and all changes which come within the meaning and range of equivalency of the claims are therefore intended to be embraced therein.

It is claimed and desired to secure by Letters Patent:

1. A car door and window assembly comprising a lower door structure, a window, guide means positioned in a generally vertical plane and operably attached to said door structure for guiding said window from a raised position wherein the lower edge of said window is horizontal to a lowered position, a frame member surrounding said window, an elongated torsion bar spring member positioned below and in generally parallel relation to the lower edge of said window and attached to said frame for resiliently resisting lateral movement of said frame relative to said door structure, and anchoring means for attaching said torsion member to said door structure to effect a torsional stress in said torsion member when a force is applied laterally to said window or said frame.

2. An assembly in accordance with claim 1 in which said anchoring means includes upper and lower telescoping rods for accommodating raising and lowering of said window, said lower rod being pivotally connected to said door structure and said upper rod being operably and pivotally connected to said torsion member for rigidly resisting turning forces applied to said torsion member.

3. A car door and window assembly comprising a lower door structure, a window, guide means positioned in a generally vertical plane and operably attached to said door structure for guiding said window from a raised position wherein the lower edge of said window is horizontal to a lowered position, a frame member surrounding said window, an elongated torsion bar spring member positioned below and in parallel relation to the lower edge of said window and attached at the ends thereof to said frame for resiliently resisting lateral movement of said frame relative to said door structure, and anchoring means attached to said door structure and to said torsion member between the ends thereof to effect a torsional stress in said torsion member when a force is applied laterally to said window or said frame.

4. A car door and window assembly comprising a lower door structure, a window, guide means positioned in a generally vertical plane and operably attached to said door structure for guiding said window from a fully raised position wherein the lower edge of said window is horizontal to an intermediate position wherein the lower edge of said window is inclined and to a fully lowered position wherein the lower edge of said window is horizontal, a frame member surrounding said window, an elongated torsion bar spring member positioned below and in parallel relation to the lower edge of said window and attached at the ends thereof to said frame for resiliently resisting lateral movement of said frame relative to said door structure, and anchoring means attached between said door structure and said torsion member to effect a torsional stress in said torsion member when a force is applied laterally to said window or said frame.

5. An assembly in accordance with claim 4 in which said anchoring means includes a holster bracket rigidly attached to said torsion member between the ends thereof, upper and lower telescoping rods for accommodating raising and lowering of said window, said lower rod being pivotally connected to said door structure and said upper rod being pivotally connected to said holster bracket, said holster bracket being formed to snugly engage said upper rod when said window is in a raised position so that said telescoping rods and said holster bracket rigidly resist turning forces applied to said torsion member.

6. A guide and follower assembly for an automobile window or the like comprising a guide rail having a longitudinally extending shoulder portion and a recessed channel portion, a guide follower having a portion thereof disposed in said channel portion and being adapted to have a member to be guided attached thereto, and a plate member attached to said follower and engaging said guide rail shoulder portion, said plate member having a laterally extending portion which bends around the edge of said shoulder portion in straddling relation thereto for maintaining said follower in said channel.

7. A guide and follower assembly for an automobile window or the like comprising a guide rail having a longitudinally extending shoulder portion and a generally U-shaped channel portion, a guide follower having a cylindrically shaped portion thereof disposed in said channel portion and being adapted to have a member to be guided attached thereto, and a plate member attached to said follower and engaging said guide rail shoulder portion, said plate member having a laterally extending portion which bends around the edge of said shoulder portion in straddling relation thereto for maintaining said follower in said channel.

8. A guide and follower assembly for an automobile window or the like comprising a guide rail having a longitudinally extending shoulder portion and a generally U-shaped channel portion, a guide follower having a threaded portion thereof disposed in said channel portion and being adapted to have a member to be guided attached to an upper portion thereof, and a plate member in operable threaded engagement with said follower and engaging said guide rail shoulder portion, said plate member having a laterally extending portion which bends around the edge of said shoulder portion in straddling relation thereto for maintaining said follower in said channel.

9. A guide and follower assembly for an automobile window or the like comprising a guide rail having a longitudinally extending shoulder portion and a channel portion, a cylindrically shaped internally threaded follower member disposed in said channel, means slidably engaging said guide rail shoulder and connected to said follower member, said means having a laterally extending portion which bends around the edge of said shoulder in straddling relation thereto to maintain said follower in said channel and limit relative pivotal movement between said follower member and said guide rail, and a second threaded member threadedly engaging said follower member, said second threaded member being adapted to have a member to be guided attached thereto.

10. A guide and follower assembly for an automobile window or the like comprising a guide rail having a longitudinally extending shoulder portion and a channel portion, a cylindrically shaped internally threaded follower member disposed in said channel, a flange portion on said follower member, plate means attached to said follower member and disposed between said follower member and said guide rail in slidable engagement with said guide rail shoulder, said plate means having a laterally extending portion which bends around the edge of said shoulder in straddling relation thereto to maintain said follower in said channel and limit relative pivotal movement between said follower member and said guide rail, and a second threaded member threadedly engaging said follower member, said second threaded member being adapted to have a member to be guided attached thereto.

11. A guide and follower assembly for an automobile window or the like comprising a guide rail having a longitudinally extending channel portion, a threaded follower member disposed in said channel, means slidably engaging said guide rail and connected to said follower member, said means engaging said guide rail to maintain said follower in said channel and limit relative pivotal movement between said follower member and said guide rail, and a second threaded member threadedly engaging said follower member, said second threaded member being adapted to have a member to be guided attached thereto.

References Cited in the file of this patent

UNITED STATES PATENTS

| | | |
|---|---|---|
| 1,997,865 | Holt et al. | Apr. 16, 1935 |
| 2,000,561 | Haberstump | May 7, 1935 |
| 2,131,745 | Morrison | Oct. 4, 1938 |
| 2,168,242 | Roethel | Aug. 1, 1939 |
| 2,379,924 | Roethel | July 10, 1945 |
| 2,552,671 | Floraday | May 15, 1951 |
| 2,745,662 | McDougall | May 15, 1956 |
| 2,775,479 | Balint et al. | Dec. 25, 1956 |
| 2,803,492 | Wright | Aug. 20, 1957 |
| 2,811,387 | Clark | Oct. 29, 1957 |